United States Patent [19]

Karasaki et al.

[11] Patent Number: 4,949,116
[45] Date of Patent: Aug. 14, 1990

[54] FOCUS DETECTION APPARATUS OF CAMERA

[75] Inventors: Toshihiko Karasaki; Kazumi Sugitani, both of Osaka, Japan

[73] Assignee: Minolta Camera Kabushiki Kaisha, Osaka, Japan

[21] Appl. No.: 391,923

[22] Filed: Aug. 10, 1989

[30] Foreign Application Priority Data

Aug. 11, 1988 [JP]  Japan .................................. 63-201559

[51] Int. Cl.$^5$ ............................................ G03B 13/36
[52] U.S. Cl. ..................................... 354/408; 354/407
[58] Field of Search ........................ 354/406, 407, 408

[56] References Cited

U.S. PATENT DOCUMENTS

| | | | |
|---|---|---|---|
| 4,636,627 | 1/1987 | Matsumura | 354/407 |
| 4,774,539 | 9/1988 | Suda et al. | 354/406 |
| 4,841,326 | 6/1989 | Koyama et al. | 354/406 |

FOREIGN PATENT DOCUMENTS

0284526 11/1988 Japan .................................. 354/408

Primary Examiner—Russell E. Adams
Attorney, Agent, or Firm—Burns, Doane, Swecker & Mathis

[57] ABSTRACT

A focus detection apparatus of a camera comprising a plurality of focus condition detecting units, each of which includes at least a pair of re-imaging lens forming a pair of secondary images using a pair of light rays passed through a photo-taking lens and a condenser lens, and a CCD (charge-coupled device) line sensor receiving the images and detecting a focus condition of the photo-taking lens. All of the focus detection areas defined by each of the focus condition detecting units are located parallel one another and overlaps partially at least one other focus detection area in a perpendicular direction to a direction in which all of the focus detection areas extend. Therefore, there is no space, where the focus condition cannot be detected, among the focus detection areas in the parallel direction in which all of the focus detection areas extend.

13 Claims, 7 Drawing Sheets

FOCUS DETECTION APPARATUS OF CAMERA

BACKGROUND OF THE INVENTION

1. Field of the Invention

The present invention relates to a focus detection apparatus of a camera, which detects the focus condition of a photo-taking lens of the camera, and more particularly to a focus detection apparatus having larger focus detection field, where the focusing condition can be detected, than the conventional focus detection apparatus.

2. Description of the Prior Art

It is necessary to expand the focus detection field so that focus detecting operation may be possible with respect to the object which is moving or is in low contrast condition.

Some one-area focus detection apparatus, which have characteristic re-imaging lens and a lengthened CCD (charge-coupled device) line sensor in order to expand a focus detection area, are known. For example, in Japanese Laid-Open publication No. 156609/1987, the re-imaging lens has a concave surface in its photo-taking lens side, and in United patent application Ser. No. 4,808,808, a prism is arranged between the re-imaging lens and the CCD line sensor. It is possible for the above-mentioned focus detection apparatus that the focus detection area is expanded without regard to an open aperture value of the photo-taking lens.

However, in the above-mentioned apparatus, light fluxes used for detecting the focus condition are refracted suddenly by the concave surface of the re-forming lens or the prism arranged between the re-imaging lens and the CCD line sensor. Therefor, secondary images formed on the CCD line sensor by the re-imaging lens tend to have various aberrations, and it is necessary in order to remove the aberrations that the minute re-imaging lens or the minute prism is manufactured precisely. As a result of this, the production cost thereof becomes very expensive.

Figure 1:
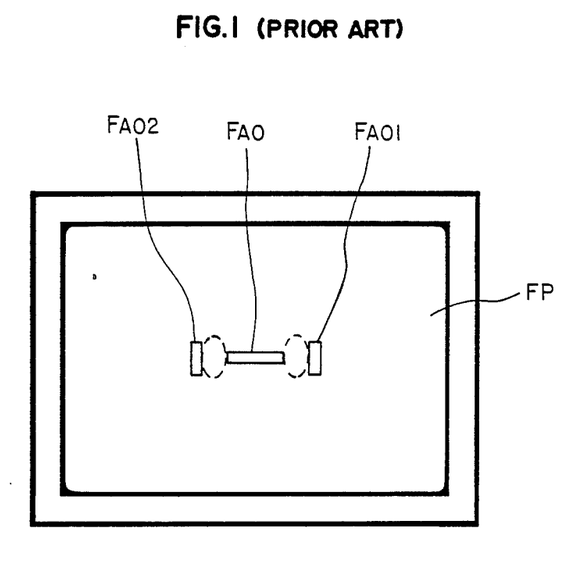
FIG. 1 is a plane view showing a view finder image corresponding to a conventional multi-area focus detection apparatus.
Figure 2:
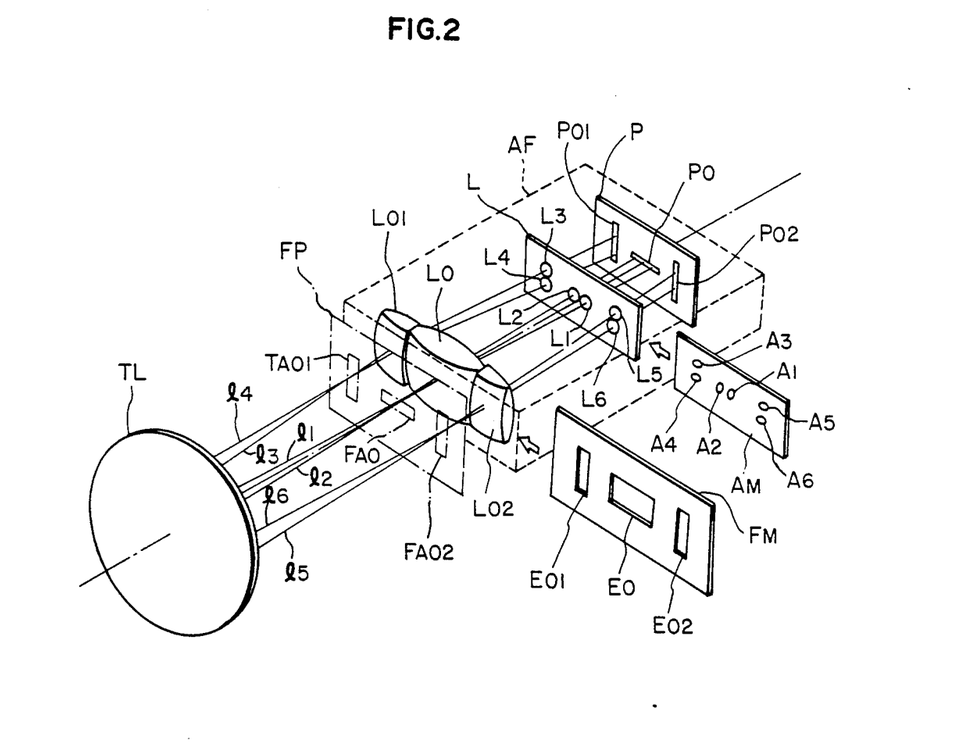
FIG. 2 is an oblique view showing the conventional multi-area focus detection apparatus.

Another well-known multi-area focus detection apparatus, which detect focus conditions with respect to the axial and off-axial focus detection areas, is shown in FIGS. 1 and 2. In this apparatus, a pair of light fluxes used for detecting the focus condition with respect to the axial focus detection area FA0, containing a pair of principal rays 11 and 12, are focused on a CCD line sensor P0, through an opening E0 provided on a field mask FM, a condenser lens L0, a pair of aperture openings A1 and A2 provided on an aperture mask AM, and a pair of re-imaging lenses L1 and L2 formed on a re-imaging lens plate L. And a pair of secondary images are formed on the CCD line sensor P0. On the other hand, a pair of light fluxes used for detecting the focus condition with respect to an off-axial focus detection areas FA01 (FA02), containing a pairs of principal rays 13 and 14 (15 and 16), are focused on a CCD line sensor P01 (P02), through an opening E01 (E02), condenser lens L01 (L02), an aperture openings A3 and A4 (A5 and A6), and a pair of re-imaging lenses L3 and L4 (L5 and L6). And a pair of secondary images are formed on the CCD line sensor P01 (P02). The focus condition of the photo-taking lens TL can be detected by means of detecting three pairs of the secondary images.

FIG. 1 shows a view finder image corresponding to the above mentioned focus detection apparatus. As described above, the focus detection areas FA0, FA1 and FA2 correspond to the CCD line sensors P0, P01 and P02, respectively. As shown by dotted lines in FIG. 1, there are two spaces which have no focus detection area among the focus detection areas FA0, FA01 and FA02. Hereinafter, the space is referred to as "the non-detection space". If there is the non-detection space among the focus detection areas, it is impossible to detect the focus condition with respect to an object existing in the non-detection space. Especially, when the object is moving, it may often come in the non-detection space.

SUMMARY OF THE INVENTION

Therefore, the object of the present invention is to provide a multi-area focus detection apparatus such that is able to expand the focus detection field, which is determined by the plurality of the focus detection areas, with a high performance and have no non-detection space among the focus detection field in a predetermined direction.

According to the present invention, to achieve the aforementioned object, the focus detection apparatus comprises, a first focus condition detecting unit including means for re-imaging a pair of light rays passed through said photo-taking lens and a condenser lens, means for recieving said pair of images, and means for detecting the focus condition of the photo-taking lens by calculating the correlation of said pair of images on the light receiving means, the focus condition detecting unit defining a first focus detection area extended in a first direction on a photo-taking field, and a second focus condition detecting unit including means for re-imaging a pair of images using a pair of light rays passed through said photo-taking lens and a condenser lens, means for receiving said pair of images, and means for detecting the focus condition of the photo-taking lens by calculating the correlation of said pair of images on the light receiving means, the second focus condition detecting unit defining a second focus detection area extended in a second direction on the photo-taking field, which is parallel to the first direction, and the second focus detection area overlapping the first focus detection area partially in a perpendicular direction to both of the first and second direction.

Because each of the first and second focus detecting units has the same structure as the conventional focus detection apparatus which has only one focus detection area, it is possible to expand the focus detection field regardless of the open aperture value of the photo-taking lens. And there is no non-detection space in the parallel direction to both the first and second direction since the second focus detection area overlaps the first focus detection area partially in the perpendicular direction to both of the first and second direction.

DETAILED DESCRIPTION OF THE PREFERRED EMBODIMENT

The following description, taken in conjunction with the drawings, sets forth the presently preferred embodiments of the invention. The embodiments of the invention disclosed herein are the best modes contemplated by the inventors for carrying out their invention in the commercial camera field, although it should be understood that various modifications can be accomplished within the present invention.

Figure 3:
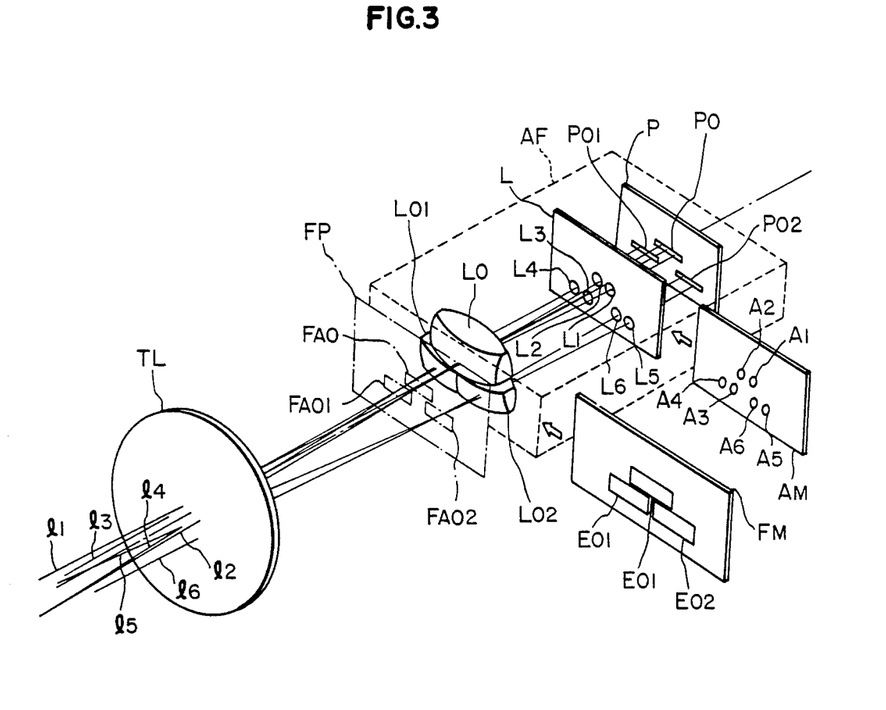
FIG. 3 is an oblique view showing a focus detection apparatus as a first embodiment of the present invention

FIG. 3 schematically shows the focus detection apparatus as a first embodiment of the present invention. In this figure, a light flux passed through a photo-taking lens TL is reflected by a movable main mirror (not shown) and a sub mirror (not shown) disposed behind the main mirror, and converged on a plane FP optically conjugate with a film plane surface. A field mask FM is arranged immediately behind the plane FP and contact with condenser lens L0, L01 and L02. The field mask has a rectangular opening E0 in its center and has another two rectangular openings E01 and E02 under both sides of the opening E0. The openings E0 and E01, E0 and E02 partially overlap one another in a perpendicular direction in all of which the openings E0, E01 and E02 extend.

A re-imaging lens plate L has a pair of re-imaging lens L1 and L2 in its center which are arranged in a parallel direction to the opening E0 provided on the field mask and has another two pair of re-imaging lens L3 and L4, L5 and L6 under both sides of the re-imaging lens L1 and L2 in a parallel direction to the CCD line sensor P0. All of the re-imaging lens L1 to L6 consist of a plano-convex lens which has the same radius of curvature, respectively . An aperture mask AM arranged immediately in front of the re-imaging lens plate L has three pair of aperture openings A1 and A2, A3 and A4, A5 and A6. Each of the aperture opening A1 to A6 corresponds to the re-imaging lens L1 to L6.

A CCD line sensor P0 is provided in the center of a substrate P in the parallel direction to the opening E0 provided on the field mask, and CCD line sensors P01 and P02 are arranged under both sides of the CCD line sensor P0 in a parallel direction to the CCD line sensor P0. Each of the CCD line sensors P0, P01 and P02 is comprised of first and second rows of a plurality of light receiving elements and receives a pair of images formed by the re-imaging lens separately by means of the first and second rows. The field mask FM, the condenser lens L0, L01 and L02, the aperture mask AM, the re-imaging lens plate L and the substrate P constitute an AF (auto focus) sensor module AF.

The focus detection apparatus of the above described construction works to detect the focus condition of the photo-taking lens TL in the following manner.

The light flux for an object existing an off-axial focus detection area (hereinafter, referred to as "the off-axial light flux") containing principal rays 13 and 14 travels toward the field mask FM away from the optical axis of the photo-taking lens TL at a predetermined incident angle relative to the optical axis. The off-axial light flux passed through the opening E01 provided on the field mask FM is diffracted toward the optical axis by the condenser lens L01, and then it projected onto the CCD line sensor P01 formed on the substrate P through the paired aperture openings A3 and A4 provided on the aperture mask AM and the paired re-imaging lens L3 and L4 provided on the re-imaging lens plate L. In this way, a pair of images with respect to the object are re-imaged on the CCD line sensor P01. On the other hand, another off-axial light flux for another off-axial focus detection area containing principal rays 15 and 16 travels toward the field mask FM away from the optical axis at the predetermined incident angle, passes through the opening E02 provided on the field mask FM, the condenser lens L02, the paired aperture openings A5 and A6 provided on the aperture mask AM and the paired re-imaging lens L5 and L6 provided on the re-imaging lens plate L and then are projected onto the CCD line sensor P02. In this way, a pair of images are re-imaged on the CCD line sensor P02.

A light flux for the object existing an axial focus detection area (hereinafter, referred as to "the axial light flux") containing principal rays 11 and 12 are projected onto the CCD line sensor P0 so as to a pair of images thereon after having passed through the opening E0, the condenser lens L0, the paired aperture openings A1 and A2 and the paired re-imaging lens L1 and L2, all of which are aligned with the optical axis. By determining the positions of the three paired images on the CCD line sensors P0, P01 and P02, the focus condition of the photo-taking lens TL with respect to the object can be detect.

Figure 4:
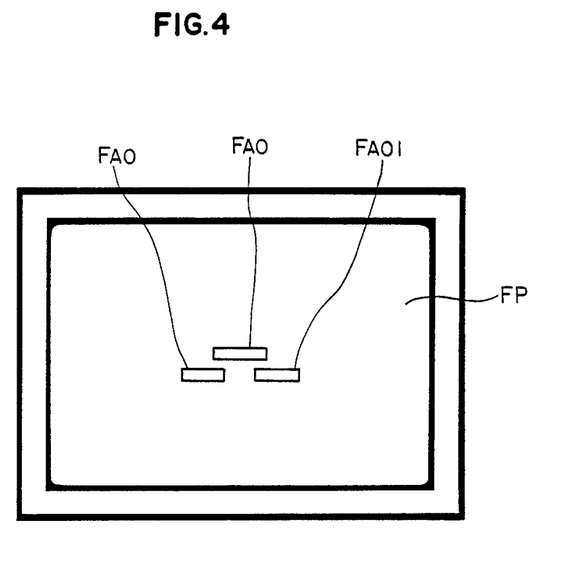
FIG. 4 is a plane view showing a view finder image corresponding to the first embodiment shown in FIG. 3.

FIG. 4 shows a view finder image corresponding to the above-mentioned embodiment shown in FIG. 3. The axial focus detection area FA0 and the off-axial focus detection areas FA1 and FA2 are corresponding to the CCD line sensors P0, P1 and P2, respectively. As shown in FIG. 4, the axial focus detection area P0 overlaps the off-axial focus detection areas P01 and P02 at both sides thereof in the vertical direction. Therefor, there is no space in which the focus condition cannot be detected (hereinafter, referred as to "the non-detection space") among the focus detection areas FA0, FA1 and FA2 in the horizontal direction. Since the individual opening, condenser lens, paired aperture openings and paired re-imaging lens are provided with each of the focus detection areas, the focus condition with respect to each of the focus detection area can be detected with the same high performance as the conventional one-area focus detection apparatus.

Figure 5:
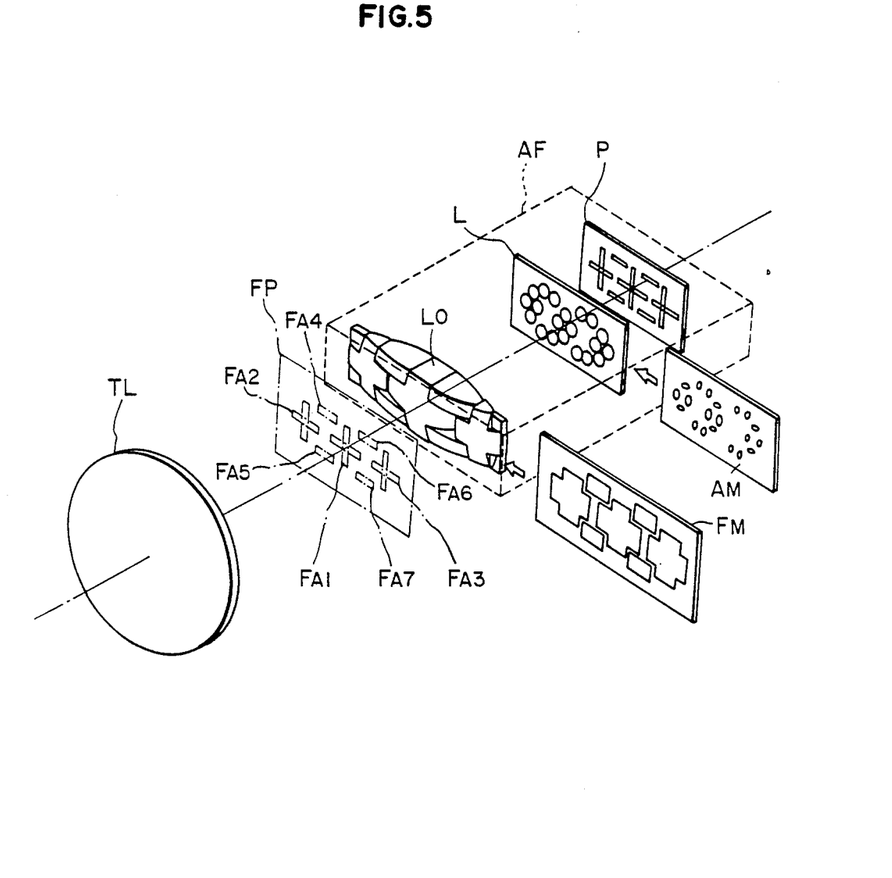
FIG. 5 is an oblique view showing a focus detection apparatus as a embodiment of the present invention.

FIG. 5 schematically shows the focus detection apparatus as a second embodiment of the invention. The location and the function of the field mask FM, the condenser lens L0, the aperture mask AM, the re-imaging lens L and the substrate P in the AF sensor module is similar to the first embodiment shown in FIG. 3. An axial focus detection area FA1 consists of two sub focus detection areas which cross at right angles on at the optical axis. An off-axial focus detection areas FA2 and FA3, each of which consists of two sub focus detection areas crossing at right angles, are arranged at both sides of the axial focus detection area FA1. Further, four off-axial focus detection areas FA4 to FA7 extended only in the horizontal direction respectively are arranged such that each of areas FA3 to FA7 overlaps partially some sub focus detection areas, which are extended in the horizontal direction, of the focus detection areas FA1 to FA3 at both sides thereof in the vertical direction. Therefor, there is no non-detection space in the horizontal direction among the focus detection areas FA1 to FA7. Furthermore, the above-mentioned focus detection apparatus can detect the focus condition with respect to the horizon or the object having a repetational pattern in the horizontal direction by means of the sub focus detection areas extended in the vertical direction.

Figure 6:
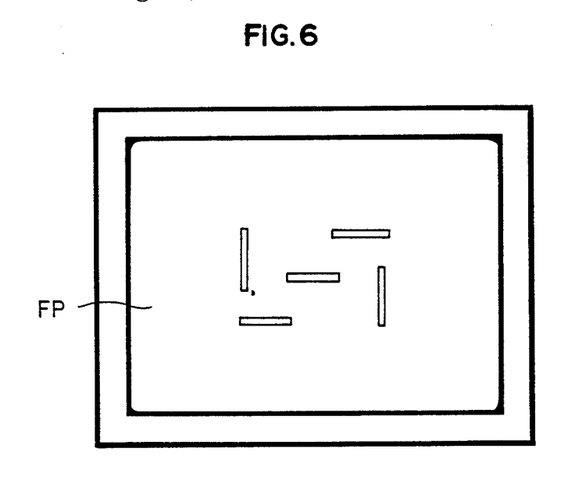
FIG. 6 a plane view showing a view finder image corresponding to a third embodiment of the present invention.
Figure 7:
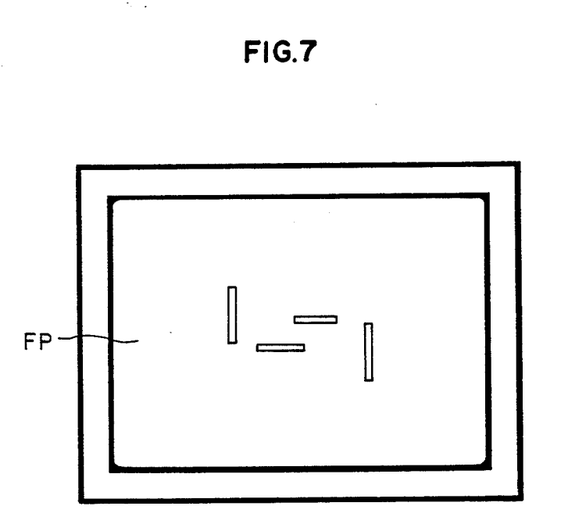
FIG. 7 is a plane view showing a view finder image corresponding to a fourth embodiment of the present invention.
Figure 8:
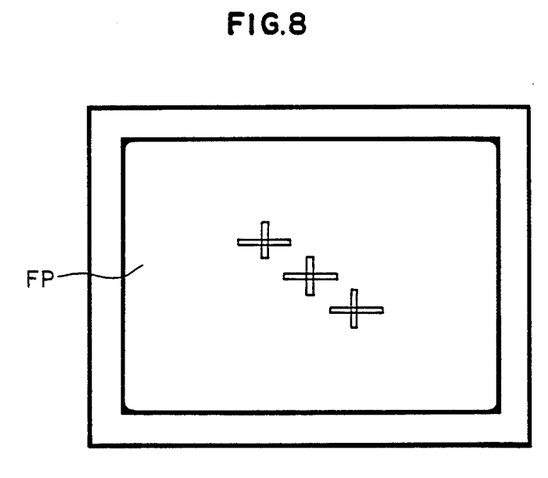
FIG. 8 a plane view showing a view finder image corresponding to a fifth embodiment of the present invention.

FIG. 6 to FIG. 8 show plane views of the view finder image corresponding to another focus detection apparatus (not shown), respectively. In these embodiments, there is no nondetection space in not only the horizontal direction but also the vertical direction since the focus detection areas extended in the horizontal direction overlap partially in the vertical direction one another and the focus detection area extended in the vertical direction overlap partially in the horizontal direction one another. Therefor, the focus condition with respect to the object having a repetational pattern in the horizontal or the vertical direction can detect with high reliability.

That is to say, the focus detection apparatus of the present invention can expand the focus detection field and get rid of the non-detection space by locating such a plurality of the focus detection areas parallel to one another that each focus detection area overlaps partially the other focus detection area.

Figure 9:
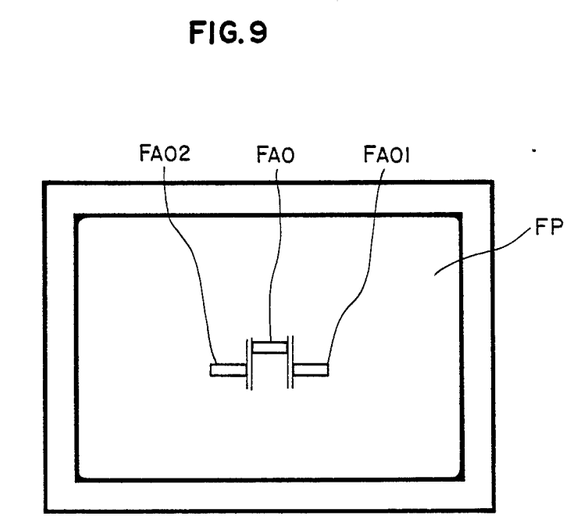
FIG. 9 is a plane view showing a view finder image corresponding to a sixth embodiment of the present invention.

Furthermore, as shown in FIG. 9, it is possible in the present invention that the focus detection areas FA0, FA01 and FA02 are arranged such that there is such a narrow space among these areas in the horizontal direction that the focus detection operation with respect to the object existing including the narrow space is possible.

It is possible that only one condenser lens is provided with a plurality of the CCD line sensors and re-imaging lens.

If the AF sensor module comprises a reflecting surface instead of the re-imaging lens, the aperture mask is provided by masking the reflecting surface except a part necessary for forming the secondary image on the CCD line sensor.

Although the present invention has fully been described in connection with the preferred embodiment thereof with reference to the accompanying drawings, it is to be noted that various changes and modifications are to be understood as included within the scope for the present invention as defined by the appended claims

What is claimed is:

1. A focus detection apparatus for a camera having a photo-taking lens, comprising;

a first focus condition detecting unit including means for re-imaging a pair of images using a pair of light rays passed through said photo-taking lens and a condenser lens, means for receiving said pair of images, and means for detecting the focus condition of the photo-taking lens by calculating the correlation of said pair of images on the light receiving means, the first focus condition detecting unit defining a first focus detection area extended in a first direction on a photo-taking field; and a second focus condition detecting unit including means for re-imaging a pair of images using a pair of light rays passed through said photo-taking lens and a condenser lens, means for receiving said pair of images, and means for detecting the focus condition of the photo-taking lens by calculating the correlation of said pair of images on the light receiving means, the second focus condition detecting unit defining a second focus detection area extended in a second direction, which is parallel to the first direction, on the photo-taking field, and wherein the second focus detection area has an overlapping part, which overlaps the first focus detection area in a perpendicular direction to the second direction, and has a non-overlapping part, which does not overlap the first focus detection area in the perpendicular direction.

2. The focus detection apparatus as claimed in claim 1, wherein the first and second direction are horizontal.

3. The focus detection apparatus as claim in claim 1, wherein the first and second direction are vertical.

4. The focus detection apparatus as claimed in claim 1, further comprising ;

a third focus condition detecting unit including means for re-imaging a pair of images using a pair of light rays passed through said photo-taking lens and a condenser lens, means for receiving said pair of images, and means for detecting the focus condition of the photo-taking lens by calculating the correlation of said pair of images on the light receiving means, the third focus condition detecting unit defining a third focus detection area extended in a third direction which is perpendicular to both of the first and second direction.

5. The focus detection apparatus as claimed in claim 4, wherein the first and second direction are horizontal.

6. The focus detection apparatus as claimed in claim 4, wherein the first and second direction are vertical.

7. The focus detection apparatus as claimed in claim 1,further comprising ;

a fourth focus condition detecting unit including means for re-imaging a pair of images using a pair of light rays passed through said photo-taking lens and a condenser lens, means for receiving said pair of images, and means for detecting the focus condition of the photo-taking lens by calculating the correlation of said pair of images on the light receiving means,. the fourth focus condition detecting unit defining a fourth focus detection area extended in a fourth direction on the photo taking field, which is not parallel to both the first and second direction ; and a fifth focus condition detecting unit including means for re-imaging a pair of images using a pair of light rays passed through said photo-taking lens and a condenser lens means for receiving said pair of images, and means for detecting the focus condition of the photo-taking lens by calculating the correlation of said pair of images on the light receiving means, the fifth focus condition detecting unit defining a fifth focus detection area extended in a fifth direction on the photo-taking field, which is parallel to the fourth direction and is not parallel to both the first and second direction, and the fifth focus detection area overlapping the fourth focus detection area partially in a perpendicular direction to both of the fourth and fifth direction.

8. The focus detection apparatus as claimed in claim 7, wherein either both of the first and second direction or both of the fourth and fifth direction are horizontal.

9. The focus detection apparatus as claimed in claim 7, wherein either both of the first and second direction or both of the fourth and fifth direction are vertical.

10. The focus detection apparatus as claimed in claim 7, wherein the first and second direction are perpendicular to the fourth and fifth direction.

11. The focus detection apparatus as claimed in claim 10, wherein the first and second directions are horizontal.

12. A focus detection apparatus for a camera having a photo-taking lens, comprising ;

a plurality of focus detecting units, each of which includes means for re-imaging a pair of images using a pair of light rays passed through said photo-taking lens and a condenser lens, means for receiving said pair of images. and means for detecting the focus condition of the photo-taking lens by calculating the correlation of said pair of images on the light receiving means, said plurality of focus detection units defining a plurality of focus detection areas, each of which overlaps at least one focus detection area partially in a vertical direction on the photo-taking field.

13. A focus detection apparatus for a camera having a photo-taking lens, comprising ;

a first focus condition detecting unit including means for re-imaging a pair of images using a pair of light rays passed through said photo-taking lens and a condenser lens, means for receiving said pair of images, and means for detecting the focus condition of the photo-taking lens by calculating the correlation of said pair of images on the light receiving means, the first focus condition detecting unit defining a first focus detection area extended in a first direction on a photo-taking field : and a second focus condition detecting unit including means for re-imaging a pair of images using a pair of light rays passed through said photo-taking lens and a condenser lens, means for receiving said pair of images, and means for detecting the focus condition of the photo-taking lens by calculating the correlation of said pair of images on the light receiving means, the second focus condition detecting unit defining a second focus detection area extended in a second direction on the photo-taking field, which is parallel to the first direction, and the second focus detection area having space between the first focus detection area in a parallel direction to both of the first and second direction, wherein said space is as narrow as the focus detection operation is possible for an object existing in an area including said space.

* * * * *